(12) United States Patent
Faresse et al.

(10) Patent No.: US 12,353,947 B2
(45) Date of Patent: Jul. 8, 2025

(54) METHOD, SYSTEM AND COMPUTER PROGRAM PRODUCT FOR SUPERVISING A CONTROL AREA

(71) Applicant: DORMAKABA SCHWEIZ AG, Rümlang (CH)

(72) Inventors: Marc Faresse, Châtonnaye (CH); Paul Studerus, Oberweningen (CH)

(73) Assignee: DORMAKABA SCHWEIZ AG, Rumlang (CH)

( * ) Notice: Subject to any disclaimer, the term of this patent is extended or adjusted under 35 U.S.C. 154(b) by 0 days.

(21) Appl. No.: 18/713,601

(22) PCT Filed: Nov. 1, 2022

(86) PCT No.: PCT/EP2022/080444
§ 371 (c)(1),
(2) Date: May 24, 2024

(87) PCT Pub. No.: WO2023/094124
PCT Pub. Date: Jun. 1, 2023

(65) Prior Publication Data
US 2025/0036895 A1 Jan. 30, 2025

(30) Foreign Application Priority Data
Nov. 26, 2021 (CH) .................. 70610/2021

(51) Int. Cl.
*G06K 7/10* (2006.01)
*G01S 13/72* (2006.01)
(Continued)

(52) U.S. Cl.
CPC ........ *G06K 7/10366* (2013.01); *G01S 13/726* (2013.01); *G06V 20/52* (2022.01); *G07C 9/28* (2020.01)

(58) Field of Classification Search
CPC .. G06K 7/10366; G01S 13/726; G06V 20/52; G07C 9/28
(Continued)

(56) References Cited

U.S. PATENT DOCUMENTS

2009/0002155 A1 1/2009 Ma
2021/0304535 A1 9/2021 Studerus

FOREIGN PATENT DOCUMENTS

DE 102009000006 A1 7/2010
EP 3188134 A1 7/2017
(Continued)

OTHER PUBLICATIONS

International Search Report and Written Opinion issued in PCT Application No. PCT/EP2022/080444, mailed Feb. 10, 2023.
Search Report issued in CH Application No. 070610/2021.

*Primary Examiner* — Toan C Ly
(74) *Attorney, Agent, or Firm* — Knobbe, Martens, Olson & Bear, LLP (57) ABSTRACT

A method for supervising a control area comprising: a first tracking process using UWB detection device(s) and a second tracking process using secondary detection device(s). The first tracking process comprises: executing ultra-wideband transmissions with UWB-enabled authentication device(s); determining successive positions of the UWB-enabled authentication device(s); and determining movement trajectory(s) of the UWB-enabled authentication device(s) within the control area. The second tracking process comprises: detecting occupant(s) within the control area; determining successive positions of detected occupant(s) within the control area; and determining movement trajectory(s) of occupant(s) based on their successive positions. The movement trajectory(s) of the UWB-enabled authentication device(s) are correlated with the movement trajectory(s) of detected occupant(s). Based on the correla-
(Continued)

tion, an association of UWB-enabled authentication device(s) with detected occupant(s) is generated.

15 Claims, 8 Drawing Sheets

(51) Int. Cl.
*G06V 20/52* (2022.01)
*G07C 9/28* (2020.01)

(58) Field of Classification Search
USPC .......................................................... 235/451
See application file for complete search history.

(56) References Cited

FOREIGN PATENT DOCUMENTS

| | | | |
|---|---|---|---|
| EP | 3726253 | A1 | 10/2020 |
| WO | WO 2018/224287 | A1 | 12/2018 |

METHOD, SYSTEM AND COMPUTER PROGRAM PRODUCT FOR SUPERVISING A CONTROL AREA

CROSS-REFERENCE TO RELATED APPLICATIONS

This application is the U.S. National Phase under 35 U.S.C. § 371 of International Application No. PCT/EP2022/080444, filed Nov. 1, 2022, titled METHOD, SYSTEM AND COMPUTER PROGRAM PRODUCT FOR SUPERVISING A CONTROL AREA, which claims priority to CH Patent Application No. 070610/2021, filed Nov. 26, 2021, the entirety of each of which is hereby expressly incorporated by reference herein.

FIELD OF THE INVENTION

The present invention relates to a method for supervising a control area using a detection system comprising one or more UWB detection device(s) and one or more secondary detection device(s) associated with the control area. The present invention further relates to a detection system for supervising a control area. The present invention even further relates to a computer program product comprising computer-executable instructions, which when executed by a detection system cause the detection system to supervise a control area.

BACKGROUND OF THE INVENTION

Supervising a control area, in the context of the present application, refers to the process of uniquely detecting all occupants, in particular people, entering, exiting or present in the control area, or a particular section thereof. Depending on the level of security to be achieved, the uniquely detected occupants are also authenticated and their authorization to enter, exit or being present in the control area is verified.

Prior art systems rely on various principles for supervising a control area using corresponding technologies. According to a first known approach, referred to as "who you are", supervising a control area is aimed to be achieved by detecting the individuals themselves, implemented using biometric identification technologies. One particular biometric identification technology used for supervising a control area uses face recognition to detect individuals. While face recognition technology has its merits, it is prone to error and is therefore often not 100% reliable. Furthermore, face recognition technology has proven to be greatly affected by face covering, being for cultural and/or hygienic reasons. Alternative particular biometric identification technology used for supervising a control area uses fingerprint to detect individuals. Such is however disadvantageous as fingerprint recognition is slow, which is particularly disadvantageous in supervising control areas with a dense flow of occupants. Furthermore, fingerprint recognition is often unreliable (affected by the dryness of one's skin) and is to be avoided as it requires contact with a frequently used surface (the fingerprint reader).

In summary, prior art systems for supervising a control area which rely solely on biometric identification of the occupants are either inconvenient—as it is the case of fingerprint recognition—or unreliable—as it is the case of face recognition.

According to a further known approach, referred to as "what you have", supervising of a control area is based on detecting individuals using something the user possesses, referred to as a token or authentication device. Particularly advantageous are keyless entry systems due to their convenience and/or reliability. Keyless entry systems operate in that a RF-based detection device executes a wireless communication with an authentication device, such as a keyless fob, a keycard or an authentication device incorporating a corresponding wireless transceiver. Once said wireless communication between the detection device and the authentication device has been executed, the detection device exchanges data messages with the authentication device. The authentication can be initiated either by a user, for instance by pressing a button on the authentication device to trigger transmission of authentication data to the detection device, or from the detection device itself which periodically transmits request signals and awaits a response message from the authentication device comprising authentication data. Upon successful authentication, i.e. verification of user credentials (e.g. by correlating authentication data received from the authentication device with a list of authorized users), the detection device grants access to the user in possession of the respective authentication device, e.g. by opening a barrier. On the other hand, if the authentication fails, the detection device denies access to the user in possession of the respective authentication device, e.g. by locking the barrier/by keeping the barrier locked.

For close-range applications, a radio-frequency identification (RFID) transponder (or tag) is often used, which has mostly replaced earlier magnetic stripe cards. Other current solutions use infrared systems or radio systems to transmit an authenticating signal from an authentication device to a detection device of a security control system. Close-proximity keyless systems, (i.e. between direct contact and a threshold of a few centimeters), for example RFID based systems, allow determination of a user's proximity to a barrier by appropriate placement of a reader device of the detection device. However, as their name implies close-proximity keyless systems suffer from the disadvantage that they require a very close proximity of the authentication device to the detection device. In order to overcome this disadvantage, mid-range keyless entry systems have been proposed, in particular based on ultra-wideband UWB communication. Ultra-wideband UWB systems are advantageous since they allow reliable mid-range communication without a user having to precisely identify the reader device. As the communicating range between an authentication device and an UWB detection device increases, the convenience and ease-of-use increases, because the authentication device does not need to be placed in very close range, such as less than one centimeter from the UWB detection device. The user no longer needing to precisely locate the UWB detection device (or its antenna) not only adds convenience but also has the potential to speed up the process, thereby increasing the throughput and convenience.

Even though prior art systems for supervising a control area relying on identification of occupants based on something the occupants possess (such as a security token) are suitable for reliably detecting the security tokens, they are not suitable for detecting each occupant of a control area, including those occupants who do not carry a security token. Therefore, physical separation/isolation of occupants would be required in order to associate the security tokens with the respective occupants. However, physical separation of occupants is undesirable in certain use cases, such as in control areas with a high density/flow of occupants.

EP3188134B1 discloses a system and method for supervising a control area, combining the security provided by identification using security tokens (as part of mobile electronic devices) with the convenience of biometric identification using cameras. On one hand, current positions of mobile electronic devices (carried by occupants of the control area) are determined by processing signal properties of RF transmissions. On the other hand, the current position of all persons (with and without a security token) present in the control area is detected by processing images of the control area captured by camera(s). An ID map and a people map are created. The ID map is based on the location of mobile electronic devices (carried by occupants) and the people map is based on current position of all persons captured by the camera(s). An overlay map is created by matching the ID map with the people map, to identify persons with valid access authorization or ID and the people without valid access authorization.

However, the prior art methods/systems of supervising a control area, such as that disclosed in EP3188134B1, based on a combination of RF-based location determination combined with an additional, image-based detection of all occupants become less reliable in crowded environments, where the association between RF security tokens with occupants of the control area can no longer be unambiguously guaranteed since occupants might be so closely positioned to each other than image-based separation is not possible.

SUMMARY OF THE INVENTION

It is an object of embodiments disclosed herein to provide an improved method for supervising a control area which does not have at least some of the disadvantages of prior art solutions.

According to the present invention, this object is addressed by the features of the independent claim 1. In addition, further advantageous embodiments follow from the dependent claims and the description.

In particular, this object is addressed by a method for supervising a control area using a detection system comprising one or more UWB detection device(s) and one or more secondary detection device(s) associated with the control area, the method comprising the steps of: performing a first tracking process using the one or more UWB detection device(s) and a second tracking process using one or more secondary detection device(s), the secondary detection devices using a detection technology different from the UWB detection devices. The first tracking process—using the one or more UWB detection device(s)—comprises: successively executing ultra-wideband transmissions with UWB-enabled authentication device(s) using ultra-wideband transceiver(s) of the UWB detection device(s); determining successive positions of the UWB-enabled authentication device(s) by processing signal properties of the ultra-wideband transmissions; and determining respective movement trajectory(s) of the UWB-enabled authentication device(s) within the control area based on their successive positions. The second tracking process within the control area—using one or more secondary detection device(s)—comprises: detecting occupant(s)—in particular people, inanimate objects such as vehicles, robots, luggage, wheelchairs, etc.,—within the control area; determining successive positions of detected occupant(s) within the control area; and determining respective movement trajectory(s) of detected occupant(s) within the control area based on their successive positions. Based on the first and second tracking processes, the movement trajectory(s) of the UWB-enabled authentication device(s) are correlated with the movement trajectory(s) of detected occupant(s). Based on the correlation, an association of one or more UWB-enabled authentication device(s) with one or more detected occupant(s) is generated.

According to embodiments of the present invention, correlation of movement trajectories comprises a comparison of movement trajectories according to a similarity function, such as a comparison of movement trajectories in a chosen coordinate system, such as the Cartesian coordinate system. In particular, correlation of movement trajectories comprises correlating the movement trajectory(s) of the UWB-enabled authentication device(s) and the movement trajectory(s) of detected occupant(s) over an at least overlapping timeframe.

A UWB-enabled authentication device(s) is associated to an detected occupant(s) if their movement trajectories are sufficiently similar, i.e. they deviate by no more than a threshold value.

The movement trajectories, and in particular the successive positions must not necessarily be identical for a correlation.

Correlating the movement trajectory(s) of the UWB-enabled authentication device(s) with the movement trajectory(s) of detected occupant(s) and generating the association of UWB-enabled authentication device(s) with occupant(s) based on the correlation is advantageous since it allows an unambiguous association of the of UWB-enabled authentication device(s) with occupant(s) even in control areas with a high density of occupants. For example, if a high number of occupants, e.g. people, are very close to each other, even the high precision of localization offered by UWB technology by itself would not be sufficient to unambiguously associate the UWB-enabled authentication device(s) with occupant(s) since the occupants might even be touching each other. On the other hand, merely analyzing a sequence of images, by itself, would only improve the detection of individual occupants, but not necessarily the association of the of UWB-enabled authentication device(s) with occupant(s). Significant improvement of the association of the of UWB-enabled authentication device(s) with occupant(s) is achieved only by the inventive feature according to the present invention of determining movement trajectories of both UWB authentication devices and occupants and correlating these trajectories.

In crowded environments, occupants might be so densely arranged that at no single point in time does a snapshot of both UWB-based and secondary detection allow an unambiguous association. In such cases, determining the association of the of UWB-enabled authentication device(s) with occupant(s) by determining movement trajectories of both UWB-enabled authentication devices and occupants and correlating these trajectories is particularly reliable since despite the high density of occupants, the movement trajectories of a UWB-enabled authentication device and an occupant is essentially impossible to be correlated unless the UWB-enabled authentication device is actually carried by the respective occupant.

In order to account for the UWB-enabled authentication device carried by an occupant not being fixedly attached to the occupant, e.g. a mobile phone held in the—potentially unsteady—hands of an occupant, according to embodiments disclosed herein, one or more tolerance values along one or more coordinates of a coordinate system are defined. Correspondingly, UWB-enabled authentication device(s) are associated with detected occupant(s) if their respective movement trajectories deviate along the one or more coordinates by no more than the one or more tolerance values.

According to embodiments disclosed herein, the one or more tolerance values comprises a first tolerance value along a first coordinate of the defined coordinate system and a second tolerance value along a second coordinate of the defined coordinate system, the first tolerance value being different from the second tolerance value in order to account for different "normal" variances of trajectories in different coordinates. In order to account for a greater possible horizontal density of occupants than a possible vertical density of occupants, in particular people—wherein the defined coordinate system is a three-dimensional Cartesian coordinate system—a first tolerance value is defined along the y-axis and x-axis, and a second tolerance value is defined along the z-axis of the three-dimensional Cartesian coordinate system, the second tolerance value being greater than the first tolerance value. A higher tolerance value along the Z-axis also addresses situations when an occupant, in particular a person, while carrying the UWB-enabled authentication device, displaces it, such as taking it out of a pocket, lifting an arm holding the UWB-enabled authentication device, etc., wherein due to the human anatomy and customary usage of a mobile electronic devices, a higher vertical displacement is common than in the horizontal direction.

According to particular embodiments disclosed herein, the step of performing the second tracking process comprises processing one or more sequences of images of at least a portion of the control area to detect occupant(s) within the control area. According to even further embodiments, the method for supervising a control area further comprises the step of capturing images of at least a portion of the control area using image capture device(s) of the secondary detection device(s). The capture of images is performed by image capture devices known in the art, sequences of images being captured from a single or a multitude of angels and/or distances. Alternatively, or additionally, sequences of images are captured in various wavelength ranges, such as a first sequence of images being captured in the visible field, while a second sequence of images being captured in the infrared range.

According to further embodiments disclosed herein, in order to optimize detecting occupant(s) and/or determining respective movement trajectory(s) of detected occupant(s) and/or correlating the movement trajectories for various kinds of occupants, detected objects are categorized into one or more object categories based on one or more attributes. For example, occupants detected by the secondary detection device(s) are categorized into animate vs inanimate objects. Animate objects are categorized into animals vs. humans. Humans are categorized into children vs. adults. Thereafter, one or more of a plurality of detection algorithms is selected corresponding to the respective object category. This selected detection algorithm is then used in detecting occupant(s) and/or determining respective movement trajectory(s) of detected occupant(s) and/or correlating the movement trajectory(s) of the UWB-enabled authentication device(s) with the movement trajectory(s) of detected occupant(s). For example, a detected "object" categorized as "child" would be processed according to a detection algorithm taking in consideration the anatomical shape and size of a child, different from that of an adult. Even further, a detected "object" categorized as "dog" would be processed according to a detection algorithm taking in consideration the anatomical shape, size and typical movement trajectories of a dog (for the use case of UWB-enabled tags being attached for example to a dog's necklace).

By employing dedicated detection algorithms, the reliability of detecting occupant(s) and/or determining respective movement trajectory(s) of detected occupant(s) and/or correlating the movement trajectory(s) of the UWB-enabled authentication device(s) with the movement trajectory(s) of detected occupant(s) may be further increased.

According to embodiments disclosed herein, occupant(s) with no associated UWB-enabled authentication device(s) are detected and an alert signal is generated if at least one occupant has been detected with no associated UWB-enabled authentication device(s). According to the particular use case, different actions are triggered by the alert signal, such as an audible or visual warning, locking of physical barriers, entry(s) into an intrusion log, generation of people guidance data, etc. According to a further embodiment, entry and/or exit into, respectively out of the control area is prevented as long as at least one occupant has been detected with which no UWB-enabled authentication device could be associated, for example by means of barrier(s).

In order to address situations when even occupant(s) not carrying a UWB-enabled authentication device(s) should be authenticated, according to embodiments disclosed herein, occupant(s) associated with respective UWB-enabled authentication device(s) are authenticated by exchanging authentication data using the ultra-wideband transmission(s) between the respective UWB-enabled authentication device(s) and the ultra-wideband transceiver(s) of the UWB detection device(s), while occupant(s) with no associated UWB-enabled authentication device(s) are authenticated using alternative authentication means. Alternative authentication means comprise one or more of: a biometric identification device; an ID reader such as a barcode or RFID reader; and/or a keypad each comprised by or communicatively connectable to the detection system. Thereafter, an access control process(s) and/or people flow control process is carried out related to any one of the authenticated occupant(s). In a first step of an access control process(s), authentication data is received from the UWB-enabled authentication device or via the alternative authentication means. Having received the authentication data, the authentication data is verified in order to determine whether the authenticated occupant is authorized entry into, exit from and/or presence in the control area. Such verification of the authentication data may be performed either by a comparison with authentication data stored in a data store (comprised by or communicatively connected to the access control device) and/or by verifying using a corresponding algorithm. If, based on verifying the authentication data, it has been determined that the authenticated occupant is authorized, entry, exit and/or presence is granted to authenticated occupant. On the other hand, if, based on verifying the authentication data, it has been determined that the authenticated occupant is not authorized, entry, exit and/or presence is denied to the authenticated occupant. Granting/denying access into the control area is carried in particular out using access control barrier(s), such as doors, turnstiles or the like.

According to embodiments of the present invention, determining the location(s) of the UWB-enabled authentication device(s) is based on UWB-ranging, comprising determining both distance between the UWB detection device(s) and the UWB-enabled authentication device(s) as well as an angle of arrival of the respective UWB signals.

According to embodiments of the present invention, the UWB detection device is configured to determine the location(s) of the UWB-enabled authentication device(s) within the control area by processing signal properties of the ultra-wideband UWB transmissions such as propagation time, amplitude difference and/or phase difference of the ultra-wideband transmissions. Determining the location(s) of the UWB-enabled authentication device(s) within the control area by processing signal properties of the ultra-wideband UWB transmissions is advantageous since it allows a reliable and precise localization.

Determining the location of the UWB-enabled authentication device based on the propagation time of an ultra-wideband transmission comprises measuring the time required for a signal to travel from the ultra-wideband transceiver to an ultra-wideband communication module of the UWB-enabled authentication device and/or the time required for a signal to travel from the UWB-enabled authentication device to the ultra-wideband transceiver. In a particular embodiment, a time difference is used as a basis for determining the distance, as it is more secure against spoofing attacks, wherein a third party may use a radio relay device to gain unauthorized access to a location or system in a so-called "relay-attack". Depending on the embodiment, the time difference is a "one-way time-of-flight" time difference between the ultra-wideband transceiver sending the request value and the UWB-enabled authentication device receiving the request value, or a "round-trip time-of-flight" time difference, in which a second transmission takes place from the UWB-enabled authentication device to the ultra-wideband transceiver either prior to, or after the first transmission of the request value. In the "one-way time-of-flight" scenario, the ultra-wide-band transceiver and the UWB-enabled authentication device need to be provided with tightly synchronized clocks for accurately determining the location. In the latter case of a "round-trip time-of-flight" calculation, there is stored, either in the UWB-enabled authentication device or the ultra-wideband transceiver, an accurate representation of the processing time, i.e. the time it takes between the reception of an ultra-wideband transmission and the sending of a response ultra-wideband transmission, which processing time allows for accurately determining the distance. Measurement of a time required for the signal to travel from the ultra-wideband transceiver to the UWB-enabled authentication device and back "round-trip time-of-flight" is advantageous as it does not require the precise synchronization of clock signals of the ultra-wideband transceiver and the UWB-enabled authentication device.

Determining the location of the UWB-enabled authentication device based on amplitude difference comprises determining the difference in signal amplitude between the signal transmitted by the ultra-wideband transceiver and the signal received by the UWB-enabled authentication device (or vice-versa). By taking into consideration the attenuation of the signal, the distance between the ultra-wideband transceiver and the UWB-enabled authentication device is calculated.

Determining the location of the UWB-enabled authentication device based on phase difference comprises detecting the difference in signal phase between the signal transmitted by the ultra-wideband transceiver and the signal received by the UWB-enabled authentication device. By taking into consideration the change in signal phase, the distance between the ultra-wideband transceiver and the UWB-enabled authentication device is determined. It is to be understood that for the amplitude difference and phase difference, alternatively, the signal may also be transmitted by the UWB-enabled authentication device and received by the ultra-wideband transceiver.

It is a further object of embodiments disclosed herein to provide an improved system for supervising a control area which does not have at least some of the disadvantages of prior art solutions. According to the present invention, this object is addressed by the features of the independent claim 14. In addition, further advantageous embodiments follow from the dependent claims and the description.

In particular, this object is addressed by a detection system for supervising a control area comprising one or more UWB detection device(s) and one or more secondary detection device(s) associated with the control area, wherein the detection system is configured to carry out the method according to one of the embodiments disclosed herein.

It is a further object of embodiments disclosed herein to provide a computer program product for supervising a control area which does not have at least some of the disadvantages of prior art solutions. According to the present invention, this object is addressed by the features of the independent claim 15. In addition, further advantageous embodiments follow from the dependent claims and the description.

In particular, this object is addressed by a computer program product comprising computer-executable instructions which, when executed by a processing unit of a detection system, causes the detection system to carry out the method according to one of the embodiments disclosed herein.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described disclosure will be more fully understood from the detailed description given herein below and the accompanying drawings which should not be considered limiting to the disclosure described in the appended claims. The drawings in which:

DETAILED DESCRIPTION OF EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
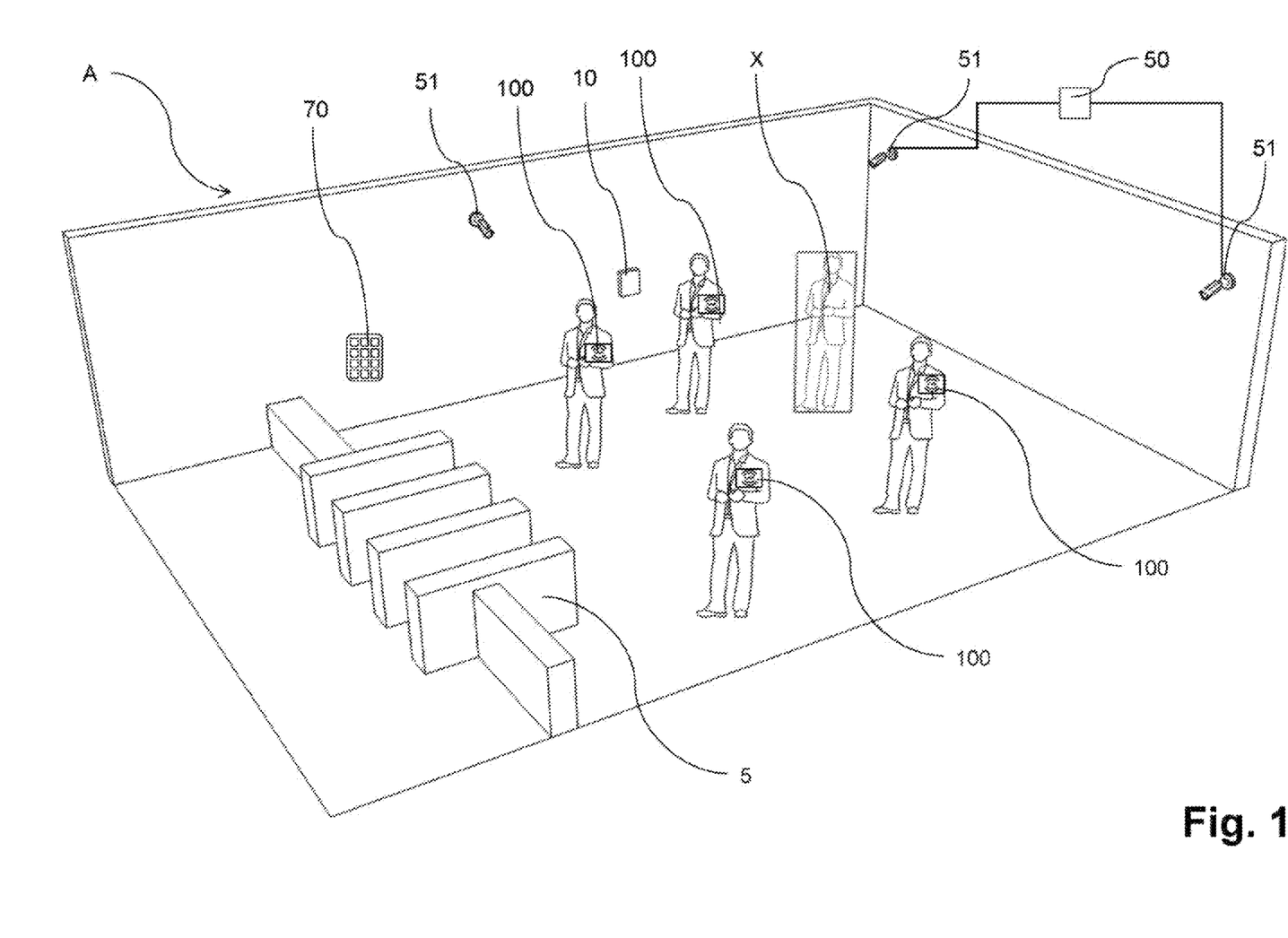
FIG. 1: shows a highly schematic perspective view of a detection system for supervising a control area according to the present invention.

FIG. 1 shows a highly schematic perspective view of a detection system 1 associated with a control area A, the control area A comprising a floor of a building including an entrance area comprising a plurality of barriers 5 arranged such as to be able to restrict or even prevent passage of persons therethrough. A UWB detection device 10 is arranged within and associated with the control area A at locations such as to enable detection of the location of authentication device 100, 100'. Further associated with the control area A are a plurality of image capture devices 51 part of the secondary detection device 50 oriented such as to capture images of occupants within the control area A.

Figure 2:
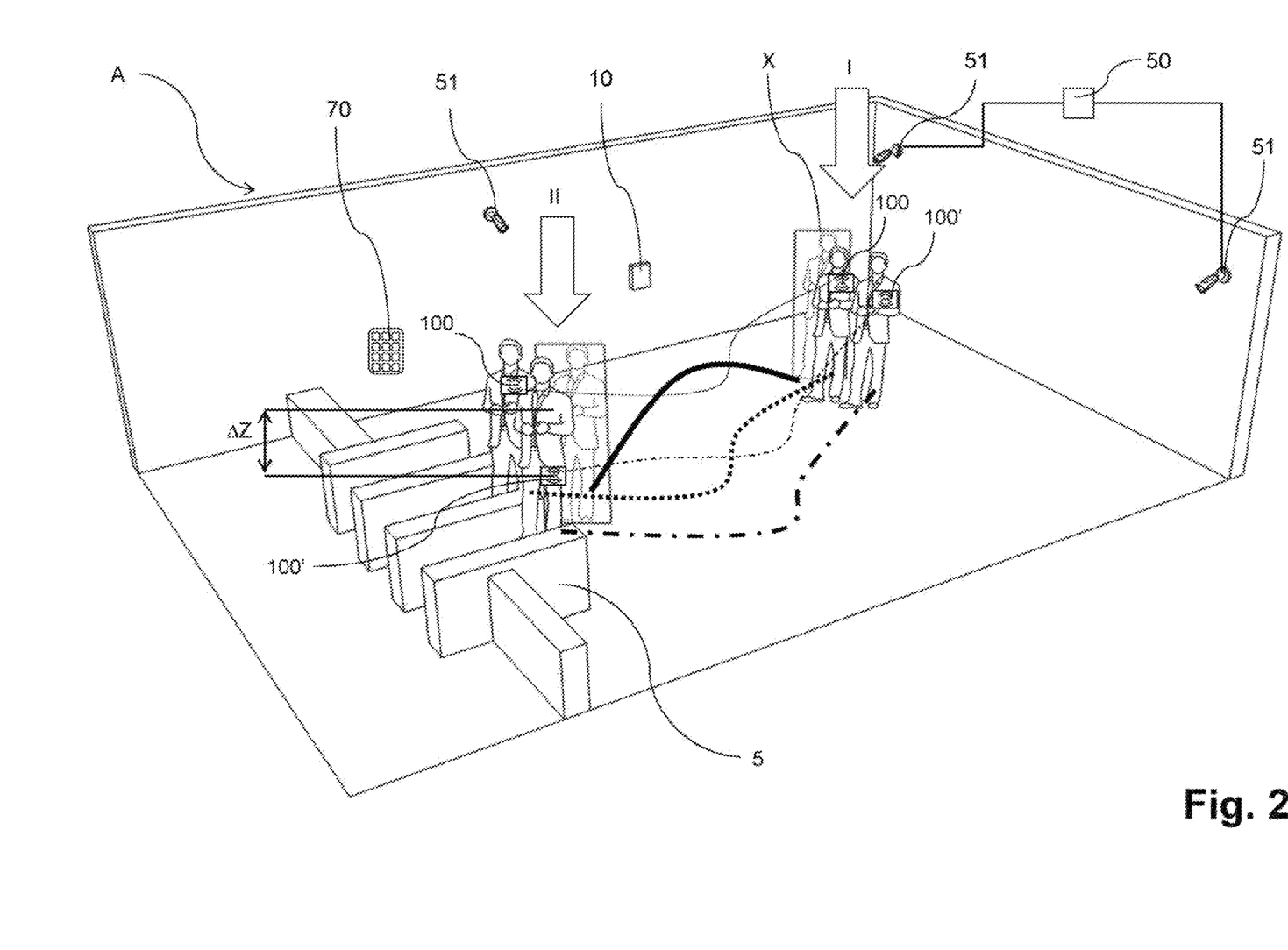
FIG. 2: shows a highly schematic perspective view of a detection system for supervising a control area according to the present invention, illustrating a group of three occupants' movement trajectories in the control area, one occupant not carrying a UWB-enabled authentication device.

For the authentication of occupants not carrying and hence not associated with an UWB-enabled authentication device, alternative authentication means 70 is provided, illustrated on FIGS. 1 and 2 with a keypad for entering a PIN.

FIG. 2 shows a highly schematic perspective view of a detection system 1 for supervising a control area according to the present invention, illustrating a group of three occupants' movement trajectories in the control area A, one occupant X not carrying a UWB-enabled authentication device. FIG. 2 shows a group of three occupants situated close to each other at two moments in time I and II. The movement trajectories of the three occupants are illustrated by thick continuous, dotted and dotted-dashed lines, respectively, while the movement trajectories of the UWB-enabled authentication device(s) 100, 100' are illustrated with thin dotted and dotted-dashed lines, respectively. The absence of a thin continuous line is due to the fact that one occupant X does not carry an UWB-enabled authentication device. As visually illustrated on FIG. 2, despite the fact that the three occupants are located and move closely together, the correlated movement trajectories of two of the three occupants and the two UWB-enabled authentication devices 100, 100' they carry (matching trajectories of the thin and thick dotted and dotted-dashed lines) enable the detection system 1 to reliably associate the two UWB-enabled authentication devices 100, 100' to the respective occupants. Also, the absence of a movement trajectory of a UWB-enabled authentication device which would correspond to the movement trajectory of occupant X enables the detection system 1 to reliably detect occupant X to take necessary actions, in particular to direct occupant X to identify itself using the alternative authentication means 70.

Also illustrated on FIG. 2 is a tolerance value $\Delta Z$ defined along the Z-axis of the Cartesian coordinate system, wherein one of the UWB-enabled authentication devices 100' is associated with one of detected occupant(s) since their respective movement trajectories deviate along the Z-axis by no more than the defined tolerance value $\Delta Z$. Hence, the association is possible, despite the fact that the occupant moved the UWB-enabled authentication device 100' from his jacket pocket (position I) into his trousers' pocket (position II), a movement in the Z-axis within the tolerance value $\Delta Z$ defined in view of the anatomical size of the occupant categorized as a human adult. As it can be seen on FIG. 2, a tolerance value $\Delta Z$ specific to the Z-axis of the Cartesian coordinate system is advantageous, since an equally large tolerance value along one or both horizontal axis of the Cartesian coordinate system would jeopardize the association, as the UWB-enabled authentication device could be erroneously associated with occupant X who is situated closer to the other two occupants than the tolerance value $\Delta Z$.

Turning now to FIGS. 3 to 7, the method for supervising a control area A according to various embodiments of the present invention shall be described with reference to corresponding flowcharts.

Figure 3:
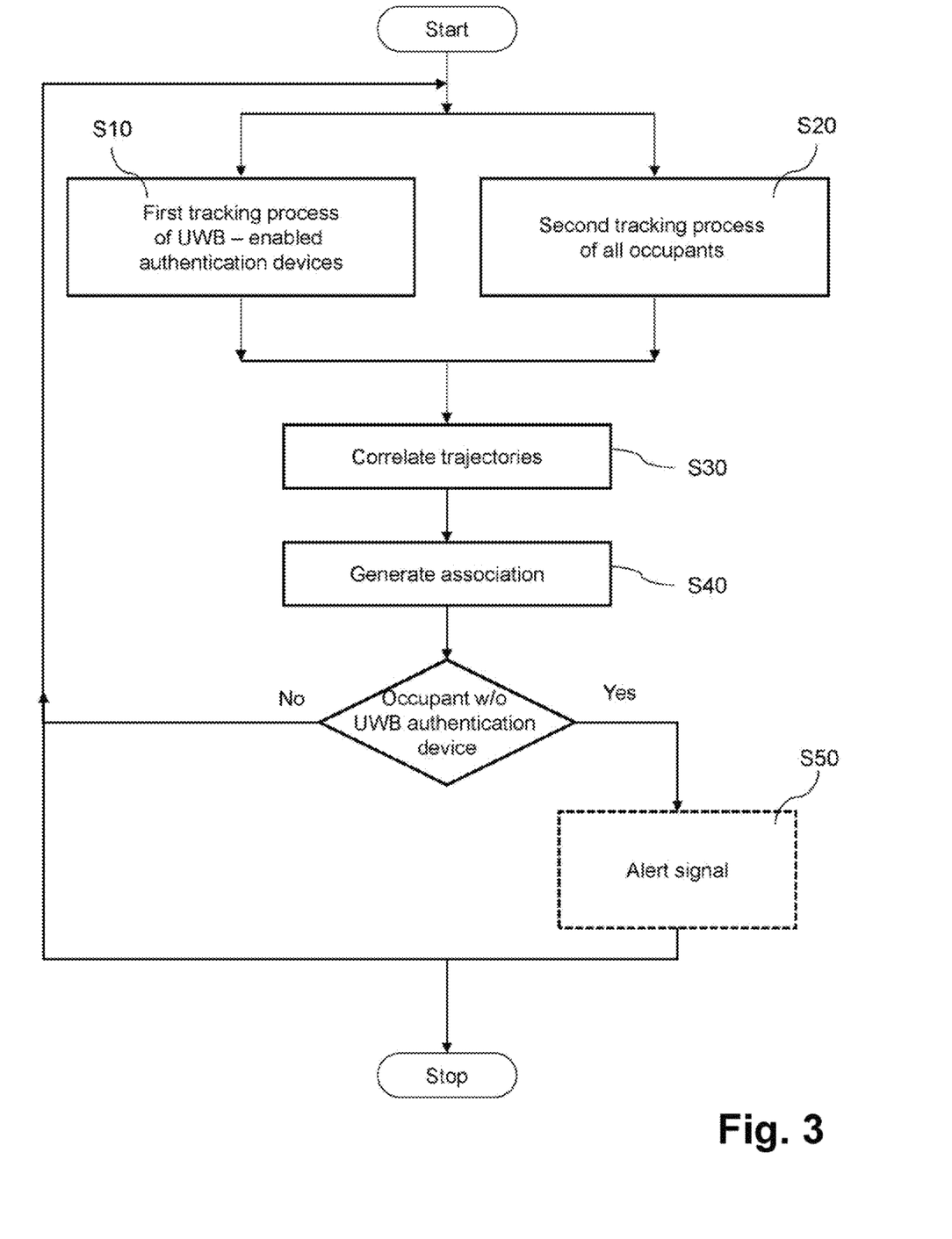
FIG. 3: shows a flow chart of a method for supervising a control area according to an embodiment the present invention.

FIG. 3 shows a flow chart of a method for supervising a control area A according to an embodiment the present invention. In a first tracking process S10 the movement trajectory(s) of UWB-enabled authentication device(s) 100, 100' within the control area A is determined using one or more UWB detection device(s) 10. In a second tracking process S20, movement trajectories(s) of occupant(s) detected within the control area A—using one or more secondary detection device(s) 50—is determined.

In a step S30, based on the first S10 and second tracking processes S20, the movement trajectory(s) of the UWB-enabled authentication device(s) 100, 100' are correlated with the movement trajectory(s) of detected occupant(s).

Based on the correlation, in a step S40, an association of one or more UWB-enabled authentication device(s) 100, 100' with one or more detected occupant(s) is generated.

In an optional step S50, an alert signal is generated if at least one occupant has been detected with no associated UWB-enabled authentication device(s) 100, 100'.

Figure 4:
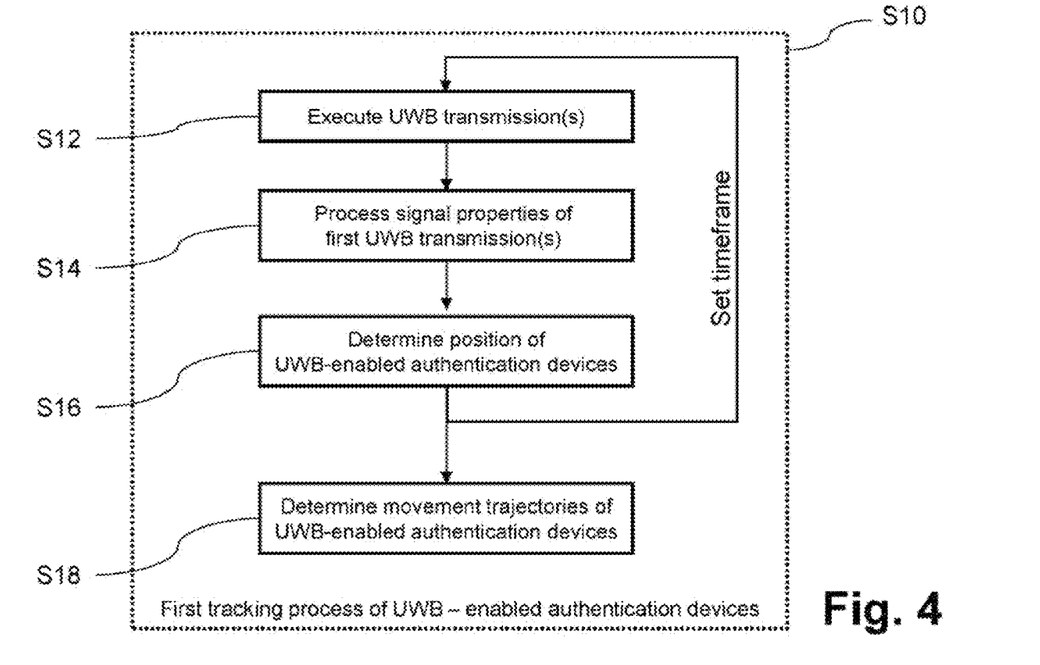
FIG. 4: shows a flow chart illustrating substeps of a first tracking process of UWB-enabled authentication devices of the method for supervising a control area according to an embodiment the present invention.

FIG. 4 shows a flow chart illustrating substeps of the first tracking process S10 of UWB-enabled authentication devices 100, 100' of the method for supervising a control area A according to an embodiment of the present invention. In a first substep S12 of the first tracking process S10 ultra-wideband transmissions are successively executed over a set timeframe with UWB-enabled authentication device(s) 100, 100' using ultra-wideband transceiver(s) 12 of the UWB detection device(s) 10. In a subsequent substep S14, signal properties of the ultra-wideband transmissions are processed. Thereafter, in substep S16, successive positions of the UWB-enabled authentication device(s) 100, 100' is determined based on said processing of signal properties of the ultra-wideband transmissions.

Having determined the successive positions of the UWB-enabled authentication device(s) 100, 100', in substep S18, the respective movement trajectory(s) of the UWB-enabled authentication device(s) 100, 100' within the control area A are determined based on their successive positions.

Figure 5:
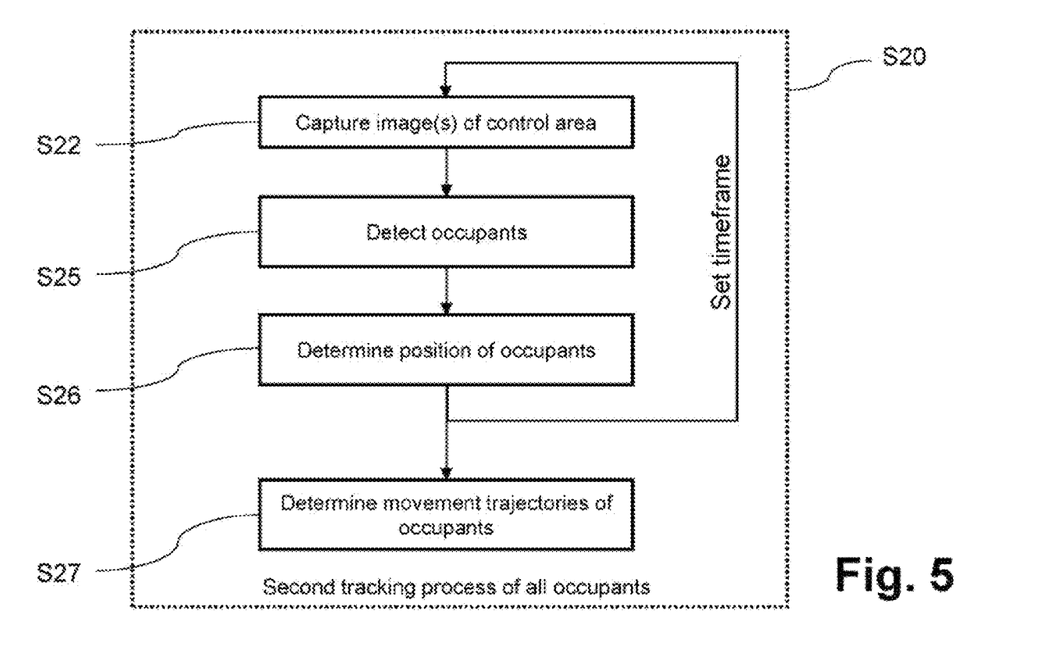
FIG. 5: shows a flow chart illustrating substeps of a second tracking process of all occupants of the method for supervising a control area according to an embodiment the present invention.

FIG. 5 shows a flow chart illustrating substeps of the second tracking process S20. In a first substep S22, images of the control area A (or at least a part thereof) are successively captured over the set timeframe. Subsequently, in substep S25 occupant(s)—in particular people—are detected within the control area A by processing the captured images. Thereafter, in substep S26 successive positions of detected occupant(s) are determined within the control area A. Based on their successive positions, in substep S27, the respective movement trajectory(s) of detected occupant(s) within the control area A are determined.

Figure 6:
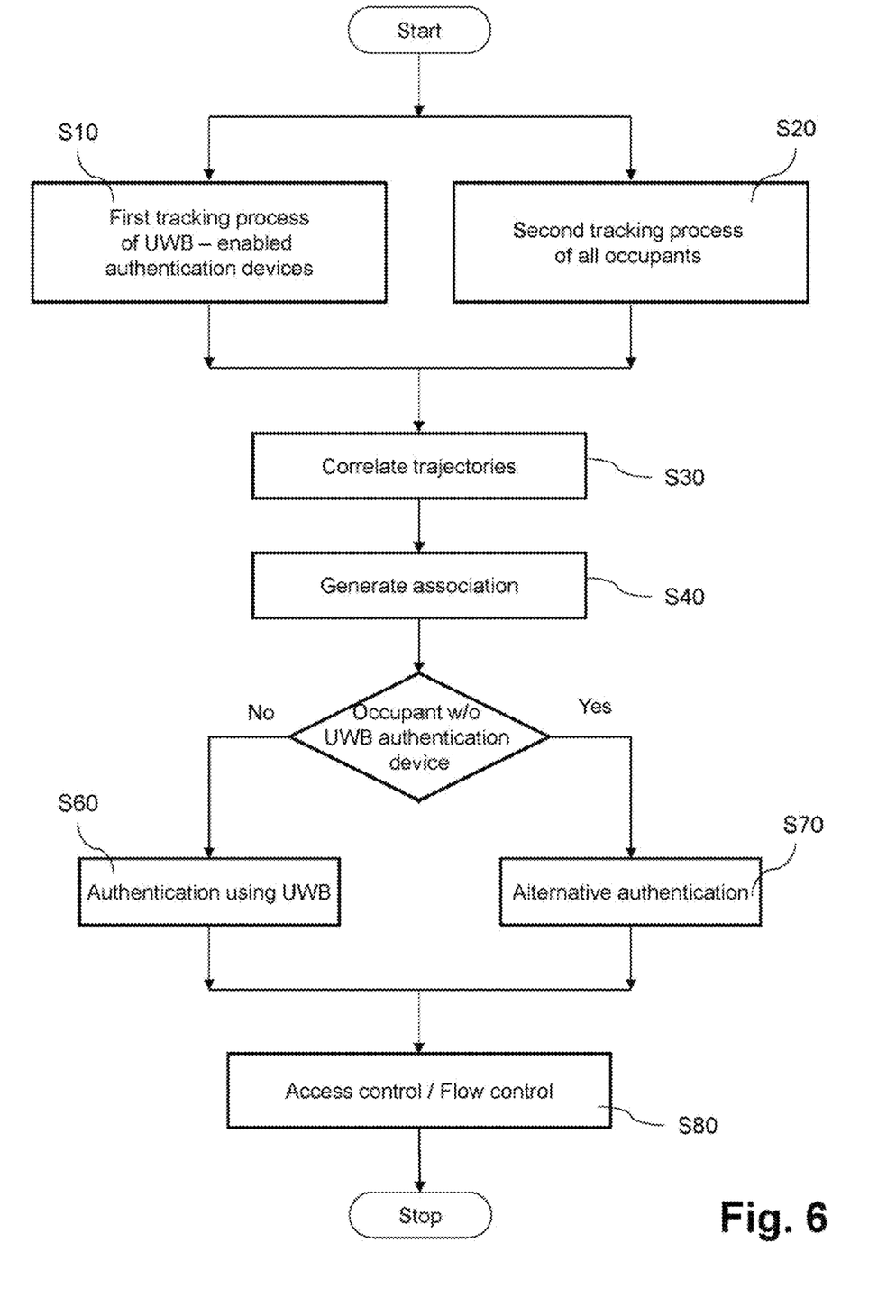
FIG. 6: shows a flow chart of a method for supervising a control area according to a further embodiment the present invention, comprising authentication of all occupants within the control area.

Turning now to FIG. 6, an embodiment of the method for supervising a control area A shall be described, comprising authentication of all occupants within the control area A, that is both occupants with and without a UWB-enabled authentication device 100, 100' associated. In order to address situations when even occupant(s) not carrying a UWB-enabled authentication device(s) 100, 100' should be authenticated, in step S60, occupant(s) associated with respective UWB-enabled authentication device(s) 100, 100' are authenticated by exchanging authentication data using the ultra-wideband transmission(s) between the respective UWB-enabled authentication device(s) 100, 100' and the ultra-wideband transceiver(s) 12 of the UWB detection device(s) 10. On the other hand, occupant(s) with no associated UWB-enabled authentication device(s) 100, 100' are authenticated in step S70 using alternative authentication means 70. Alternative authentication means 70 comprise one or more of: a biometric identification device; an ID reader such as a barcode or RFID reader; and/or a keypad 71 each comprised by or communicatively connectable to the detection system 1. Thereafter, in step S80 an access control process(s) and/or people flow control process is carried out related to any one of the authenticated occupant(s). In a first step of an access control process(s), authentication data is received from the UWB-enabled authentication device 100, 100' or via the alternative authentication means 70. Having received the authentication data, the authentication data is verified in order to determine whether the authenticated occupant is authorized entry into, exit out of and/or presence in the control area A. Such verification of the authentication data may be performed either by a comparison with authentication data stored in a data store 20 (comprised by or communicatively connected to the access control device) and/or by verifying using a corresponding algorithm. If, based on verifying the authentication data, it has been determined that the authenticated occupant is authorized, entry, exit, presence is granted to the occupant associated with the respective UWB-enabled authentication device 100, 100', respectively to the occupant authenticated using the alternative authentication means 70. On the other hand, if, based on verifying the authentication data, it has been determined that the authenticated occupant is not authorized, entry, exit and/or presence is denied to the occupant associated with the respective UWB-enabled authentication device 100, 100', respectively to the occupant authenticated using the alternative authentication means 70. Granting/denying access into the control area A is carried out in particular using barrier(s) 5, such as doors, turnstiles or the like.

Figure 7:
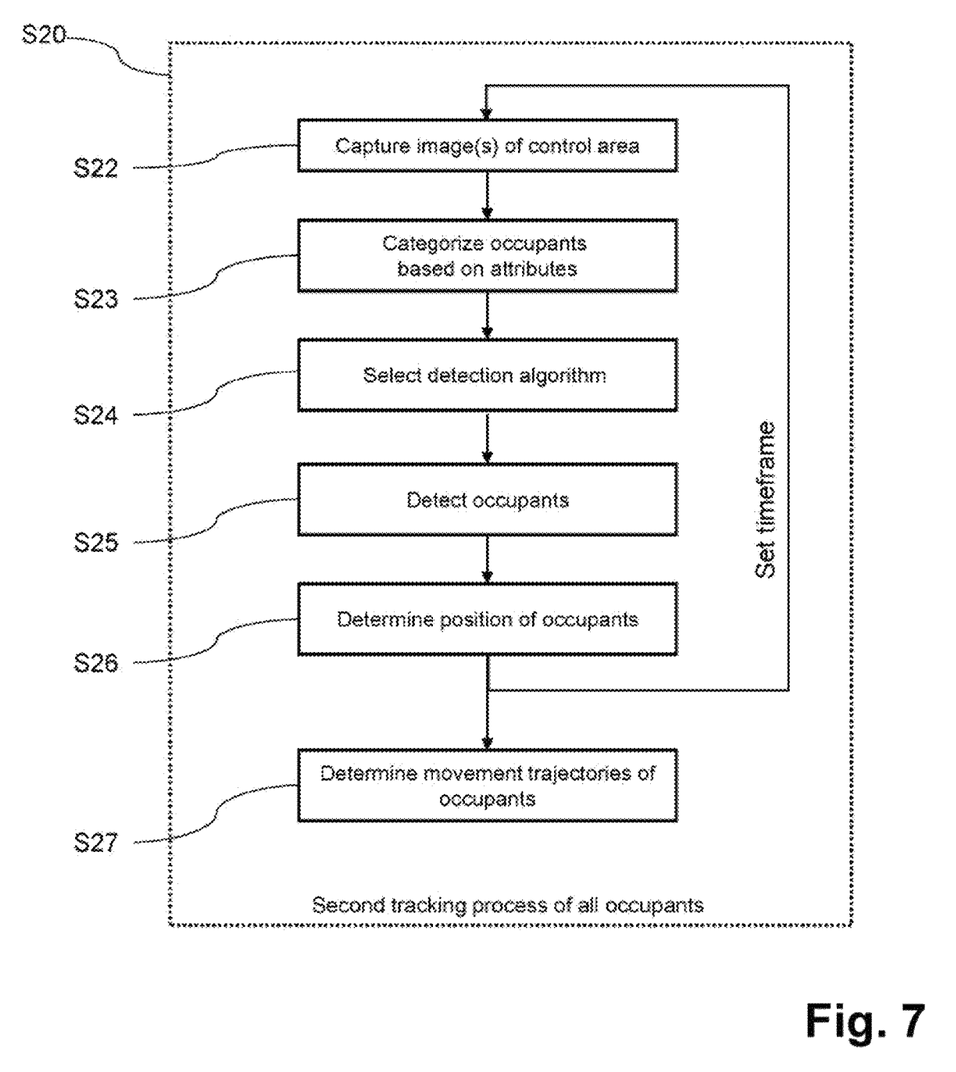
FIG. 7: shows a flow chart illustrating substeps of a second tracking process of all occupants of the method for supervising a control area according to a further embodiment the present invention, comprising categorization of detected objects based on attribute(s)

FIG. 7 shows a flow chart illustrating substeps of a second tracking process of all occupants of the method for supervising a control area A according to a further embodiment the present invention, comprising categorization of detected objects based on attribute(s). In order to optimize detecting occupant(s) and/or determining respective movement trajectory(s) of detected occupant(s) and/or correlating the movement trajectories for various kinds of occupants, in step S23 detected objects are categorized into one or more object categories based on one or more attributes. Thereafter, in step S24, one or more of a plurality of detection algorithms is selected corresponding to the respective object category. This selected detection algorithm is then used one or more of: step S25—detecting occupant(s); step S26—determining respective movement trajectory(s) of detected occupant(s); and/or step S27—correlating the movement trajectory(s) of the UWB-enabled authentication device(s) 100, 100' with the movement trajectory(s) of detected occupant(s). By employing dedicated detection algorithms, the reliability of step S25 detecting occupant(s) and/or step S26 determining respective movement trajectory(s) of detected occupant(s) and/or step S17 correlating the movement trajectory(s) of the UWB-enabled authentication device(s) 100, 100' with the movement trajectory(s) of detected occupant(s) may be further increased.

Figure 8:
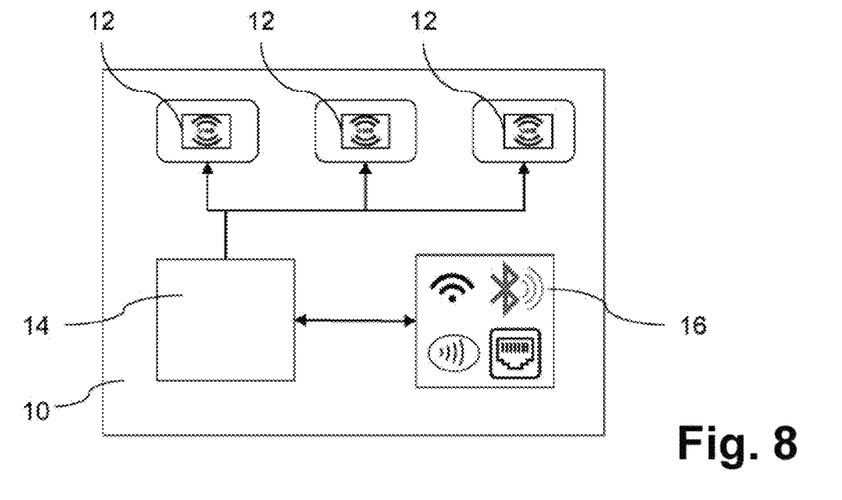
FIG. 8: shows a highly schematic block diagram of a UWB detection device according to the present invention.

FIG. 8 shows a highly schematic block diagram of a UWB detection device 10 according to the present invention. As shown, the UWB detection device 10 comprises a processing unit 14 and one or more ultra-wideband transceiver(s) 12. The one or more ultra-wideband transceiver(s) 12 are configured to executed ultra-wideband transmissions with authentication devices 100, 100' in order to determine their location by processing signal properties of the ultra-wideband UWB transmissions such as propagation time, amplitude difference and/or phase difference of the ultra-wideband transmissions. The UWB detection device 10, in particular its processing unit 14 is configured for carrying out the method for supervising the control area A according to one of the embodiments disclosed herein.

According to further embodiments of the present disclosure (shown with dashed lines on FIG. 8), the UWB detection device 10 further comprises a communication module 16 for establishing data communication link(s) with other UWB detection device 10 and/or the barrier(s) 5 and/or with a processing unit 40 of the detection system 1 external to any one of the UWB detection devices 10. According to embodiments of the present disclosure, the communication module 16 comprises wireless communication interface(s) (such as Bluetooth Low Energy BLE, a Wireless Local Area Network WLAN, ZigBee, Radio Frequency Identification RFID, Z-Wave, and/or Near Field Communication NFC interface(s)) and/or wired communication interface(s) (such as an Ethernet interface).

Figure 9A:
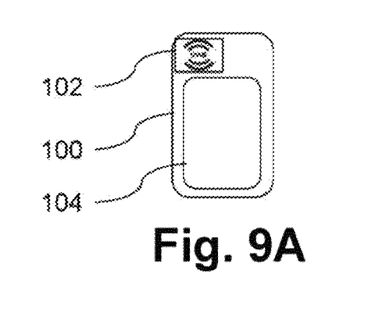
FIG. 9A: shows a highly schematic block diagram of a first embodiment of a UWB-enabled authentication device according to the present invention comprised by a smartphone.

FIG. 9A shows a highly schematic block diagram of a first embodiment of an authentication device 100, 100' according to the present invention comprised by a smartphone, the authentication device 100, 100' comprising a display screen 104 for displaying (among other information) the visual representations of the flow control data. Furthermore, the authentication devices 100, 100' comprise an ultra-wideband communication module 102. The ultra-wideband communication module 102 is configured for establishing an ultra-wideband transmission with the respective ultra-wideband transceiver(s) 12 of the UWB detection device(s) 10 of the security control system 1.

Figure 9B:
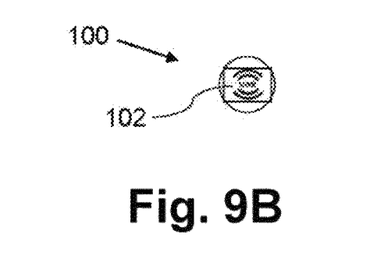
FIG. 9B: shows a highly schematic block diagram of a further embodiment of a UWB-enabled authentication device according to the present invention comprised by a tag (such as a key tag or badge)

FIG. 9B shows a highly schematic block diagram of a further embodiment of an authentication device 100, 100' according to the present invention comprised by a tag (such as a key tag or badge).

Figure 10:
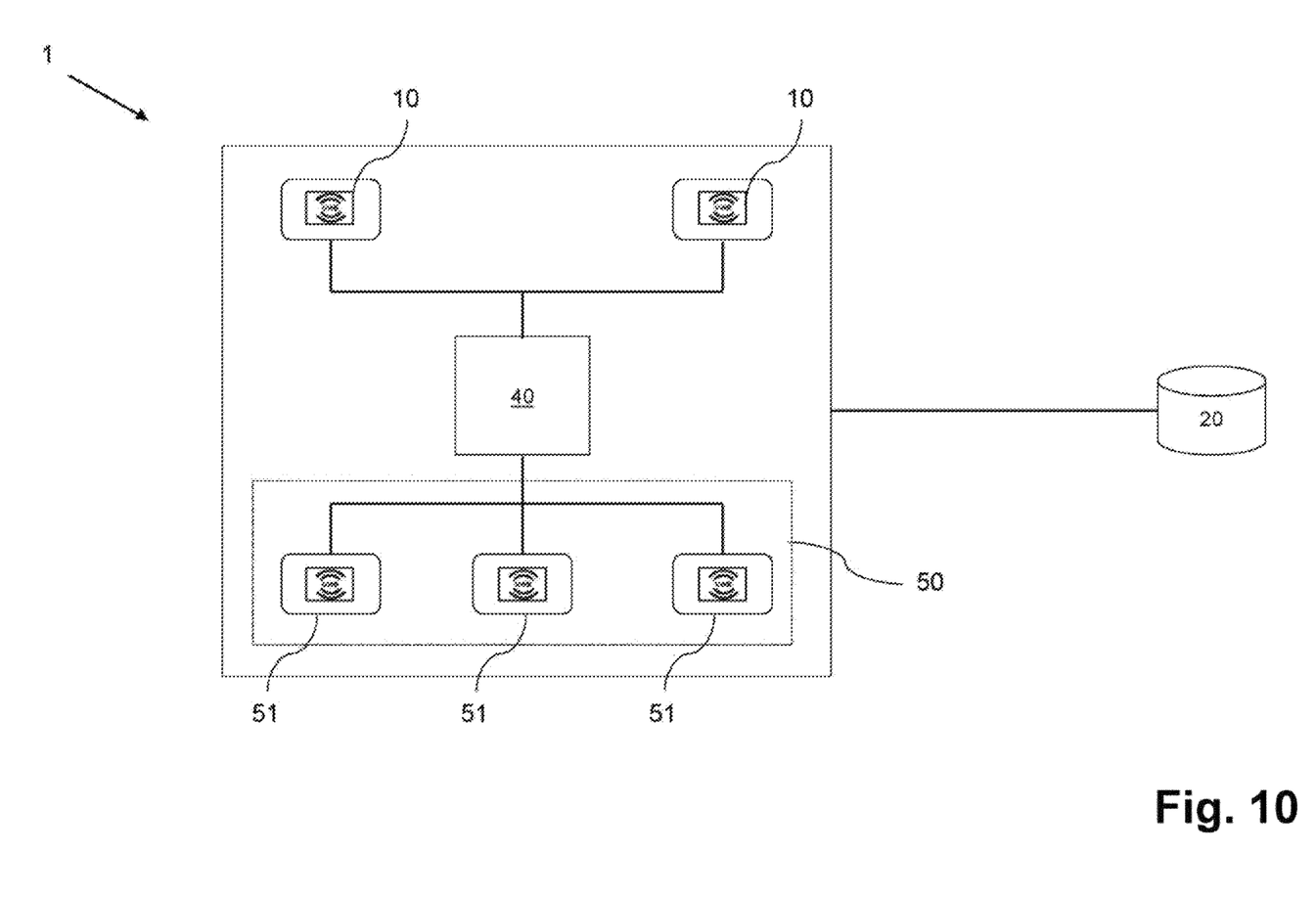
FIG. 10: shows a highly schematic block diagram of an embodiment of a detection system according to the present invention

FIG. 10 shows a highly schematic block diagram of an embodiment of a detection system 1 according to the present invention, wherein the plurality of UWB detection devices 10 and the secondary detection device 50 (comprising a plurality of image capture devices 51) are communicatively connected to a processing unit 40 and optionally to a data store 20. Even though not shown on FIG. 10, the processing unit 14 may be part of any one of the UWB detection devices 10, or even distributed across several of the UWB detection devices 10.

LIST OF REFERENCE NUMERALS detection system 1
barrier 5
UWB detection device 10
ultra-wideband transceiver 12
processing unit (of UWB detection device) 14
processing unit (of detection system) 40
communication module 16
data store 20
secondary detection device 50
image capture device 51
authentication device (of secondary detection device) 100, 100'
ultra-wideband communication module (of the authentication device) 102
display (of authentication device) 104
control area A

What is claimed is:

1. A method for supervising a control area using a detection system comprising one or more UWB detection device(s) and one or more secondary detection device(s) associated with the control area, the method comprising the steps of:
performing a first tracking process within the control area using the one or more UWB detection device(s), comprising:
successively executing ultra-wideband transmissions with UWB-enabled authentication device(s) using ultra-wideband transceiver(s) of the one or more UWB detection device(s);
determining successive positions of the UWB-enabled authentication device(s) by processing signal properties of the ultra-wideband transmissions; and
determining respective movement trajectory(s) of the UWB-enabled authentication device(s) within the control area based on their successive positions;
performing a second tracking process within the control area using one or more secondary detection device(s), comprising:
detecting occupant(s) within the control area;
determining successive positions of detected occupant(s) within the control area; and
determining respective movement trajectory(s) of detected occupant(s) within the control area based on their successive positions;
correlating the movement trajectory(s) of the UWB-enabled authentication device(s) with the movement trajectory(s) of detected occupant(s); and
generating an association of one or more UWB-enabled authentication device(s) with one or more detected occupant(s) based on the correlation.

2. The method according to claim 1, wherein the step of generating an association of one or more UWB-enabled authentication device(s) with one or more detected occupant(s) comprises:
defining one or more tolerance values along one or more coordinates of a coordinate system; and
associating the one or more UWB-enabled authentication device(s) with detected occupant(s) if their respective movement trajectories deviate along the one or more coordinates by no more than the one or more tolerance values.

3. The method according to claim 2, wherein the one or more tolerance values comprises a first tolerance value along a first coordinate of the defined coordinate system and a second tolerance value along a second coordinate of the defined coordinate system, the first tolerance value being different from the second tolerance value.

4. The method according to claim 2, wherein the defined coordinate system is a three-dimensional Cartesian coordinate system, wherein a first tolerance value is defined along the y-axis and x-axis, and a second tolerance value is defined along the z-axis of the three-dimensional Cartesian coordinate system, the second tolerance value being greater than the first tolerance value.

5. The method according to claim 1, wherein performing the second tracking process comprises processing one or more sequences of images of at least a portion of the control area to detect occupant(s) within the control area.

6. The method according to claim 5, wherein performing the secondary tracking process comprises capturing images of at least a portion of the control area using image capture device(s) of the one or more secondary detection device(s).

7. The method according to claim 1, further comprising:
detecting one or more objects within the control area;
categorizing the one or more detected objects into one or more object categories based on one or more attributes;
selecting one or more of a plurality of detection algorithms corresponding to the respective object category; and
using the selected detection algorithm(s) in detecting occupant(s) and/or determining respective movement trajectory(s) of detected occupant(s) and/or correlating the movement trajectory(s) of the UWB-enabled authentication device(s) with the movement trajectory(s) of detected occupant(s).

8. The method according to claim 1, further comprising:
detecting occupant(s) with no associated UWB-enabled authentication device(s); and
generating an alert signal if at least one occupant has been detected with no associated UWB-enabled authentication device(s).

9. The method according to claim 1, further comprising:
authenticating the occupant(s) associated with respective UWB-enabled authentication device(s) by exchanging authentication data using the ultra-wideband transmission(s) between the respective UWB-enabled authentication device(s) and the ultra-wideband transceiver(s) of the UWB detection device(s);
authenticating occupant(s) with no associated UWB-enabled authentication device(s) using alternative authentication means; and
performing access control process(s) and/or people flow control related to any one of the authenticated occupant(s).

10. The method according to claim 9, wherein the access control process(s) comprises:
determining whether the authenticated occupant(s) is/are authorized access into the control area;
if the occupant(s) is/are authorized, granting access the control area; and
if the occupant(s) is/are not authorized, denying access into the control area.

11. The method according to claim 9, wherein granting/denying entry into and/or exit from and/or presence in the control area is carried out using access control barrier(s).

12. The method according to claim 1, further comprising preventing entry into and/or exit from and/or presence in the control area (A) as long as at least one occupant has been detected with which no UWB-enabled authentication device could be associated.

13. The method according to claim 1, wherein the processing of the signal properties comprises processing one or more of: a propagation time, an amplitude variation, or a phase difference of signals of one or more of the ultra-wideband transmission(s).

14. A detection system for supervising a control area comprising one or more UWB detection device(s) and one or more secondary detection device(s) associated with the control area, wherein the detection system is configured to:
    perform a first tracking process within the control area using the one or more UWB detection device(s), comprising:
        successively execute ultra-wideband transmissions with UWB-enabled authentication device(s) using ultra-wideband transceiver(s) of the UWB detection device(s);
        determine successive positions of the UWB-enabled authentication device(s) by processing signal properties of the ultra-wideband transmissions; and
        determine respective movement trajectory(s) of the UWB-enabled authentication device(s) within the control area based on their successive positions;
    perform a second tracking process within the control area using one or more secondary detection device(s), comprising:
        detect occupant(s) within the control area;
        determine successive positions of detected occupant(s) within the control area; and
        determine respective movement trajectory(s) of detected occupant(s) within the control area based on their successive positions;
    correlate the movement trajectory(s) of the UWB-enabled authentication device(s) with the movement trajectory(s) of detected occupant(s); and
    generate an association of one or more UWB-enabled authentication device(s) with one or more detected occupant(s) based on the correlation.

15. A computer program product comprising computer-executable instructions which, when executed by a processing unit of a detection system, causes the detection system to:
    perform a first tracking process within the control area using the one or more UWB detection device(s), comprising:
        successively execute ultra-wideband transmissions with UWB-enabled authentication device(s) using ultra-wideband transceiver(s) of the UWB detection device(s);
        determine successive positions of the UWB-enabled authentication device(s) by processing signal properties of the ultra-wideband transmissions; and
        determine respective movement trajectory(s) of the UWB-enabled authentication device(s) within the control area based on their successive positions;
    perform a second tracking process within the control area using one or more secondary detection device(s), comprising:
        detect occupant(s) within the control area;
        determine successive positions of detected occupant(s) within the control area; and
        determine respective movement trajectory(s) of detected occupant(s) within the control area based on their successive positions;
    correlate the movement trajectory(s) of the UWB-enabled authentication device(s) with the movement trajectory(s) of detected occupant(s); and
    generate an association of one or more UWB-enabled authentication device(s) with one or more detected occupant(s) based on the correlation.

\* \* \* \* \*